United States Patent
Nakamura (10) Patent No.: US 12,098,791 B2
(45) Date of Patent: Sep. 24, 2024

(54) JOINT MEMBER, METHOD FOR PRODUCING JOINT MEMBER, AND METHOD FOR CONNECTING FLEXIBLE TUBE TO JOINT MEMBER

(71) Applicant: NEC Platforms, Ltd., Kawasaki (JP)

(72) Inventor: Yasuhito Nakamura, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 17/768,306

(22) PCT Filed: Nov. 2, 2020

(86) PCT No.: PCT/JP2020/041051
§ 371 (c)(1),
(2) Date: Apr. 12, 2022

(87) PCT Pub. No.: WO2021/095585
PCT Pub. Date: May 20, 2021

(65) Prior Publication Data
US 2024/0102591 A1    Mar. 28, 2024

(30) Foreign Application Priority Data
Nov. 13, 2019    (JP) .................................. 2019-205339

(51) Int. Cl.
*F16L 33/26*    (2006.01)
*B23K 1/18*    (2006.01)
(Continued)

(52) U.S. Cl.
CPC ................ *F16L 33/26* (2013.01); *B23K 1/18* (2013.01); *B23K 2101/06* (2018.08); *B23K 2103/05* (2018.08)

(58) Field of Classification Search
CPC . F16L 13/08; F16L 33/00; F16L 33/26; F16L 2201/10; B23K 1/18
See application file for complete search history.

(56) References Cited

U.S. PATENT DOCUMENTS

2015/0260322 A1* 9/2015 Mako, Jr. .................. C10L 1/06
428/34.1

FOREIGN PATENT DOCUMENTS

DE    112011104998 B4    1/2014
JP    H10-281357 A    10/1998
(Continued)

OTHER PUBLICATIONS

International Search Report for PCT Application No. PCT/JP2020/041051, mailed on Dec. 8, 2020.
(Continued)

*Primary Examiner* — Aaron M Dunwoody (57) ABSTRACT

A joint member includes a joint main body configured to include a flow path portion formed and an opening portion communicating with the flow path portion, and a tube member configured to include an end portion inserted into the opening portion of the joint main body and joined to the joint main body by brazing. The joint main body includes a step portion on which the end portion of the tube member inserted into the opening portion abuts. The tube member includes an annular recessed portion recessed from an outer peripheral surface of the tube member and formed on a flexible tube side with respect to an end surface on a joint main body side.

6 Claims, 10 Drawing Sheets

(51) Int. Cl.
 *B23K 101/06* (2006.01)
 *B23K 103/04* (2006.01)

(56) References Cited

FOREIGN PATENT DOCUMENTS

JP  2003-130528 A  5/2003
JP  2011-079003 A  4/2011

OTHER PUBLICATIONS

Extended European Search Report for EP Application No. 20888661.4, dated on Oct. 24, 2023.

* cited by examiner

JOINT MEMBER, METHOD FOR PRODUCING JOINT MEMBER, AND METHOD FOR CONNECTING FLEXIBLE TUBE TO JOINT MEMBER

This application is a National Stage Entry of PCT/JP2020/041051 filed on Nov. 2, 2020, which claims priority from Japanese Patent Application 2019-205339 filed on Nov. 13, 2019, the contents of all of which are incorporated herein by reference, in their entirety.

TECHNICAL FIELD

The present invention relates to a joint member, a method for producing the joint member, and a method for connecting a flexible tube to the joint member.

BACKGROUND ART

When connecting tubes through which a fluid flows, joint members that can be attached to and detached from each other are provided at the end portions of both tubes. Both tubes are connected to each other by engaging the joint member provided at an end portion of one of the tubes and the joint member provided at an end portion of the other of the tubes with each other.

Patent Document 1 discloses a configuration in which one tube is expanded and the other tube is inserted into one tube to connect the tubes to each other at the connecting portion of the tubes (refrigerant tubes) through which a cooling medium of a cooling apparatus flows. Patent Document 1 discloses a configuration in which a plurality of slits formed in an annular direction are provided on both contact surfaces of the connecting portion of the tubes. When welding tubes to each other, a brazing material accumulates in these slits, so that the tubes are joined to each other.

PRIOR ART DOCUMENT

Patent Document

Patent Document 1: Japanese Unexamined Patent Application, First Publication No. 2003-130528

SUMMARY

Problems to be Solved by the Invention

Incidentally, the joint member may be configured to include separate parts of a joint main body and a tube member to which the tube is to be connected.

However, when the joint main body and the tube member are joined by brazing as disclosed in Patent Document 1, the range in which the brazing material protrudes from a joint portion may vary.

An example object of the present invention is to provide a joint member, a method for producing the joint member, and a method for connecting a flexible tube to the joint member that solve the above-described problems.

Means for Solving the Problems

A joint member according to a first example aspect of the present invention is a joint member to which a flexible tube is to be connected, and the joint member includes a joint main body configured to include a flow path portion formed therein and an opening portion with an inner diameter larger than an inner diameter of the flow path portion and communicating with the flow path portion, and a tube member configured to include an end portion inserted into the opening portion of the joint main body and joined to the joint main body by brazing, and to be inserted into the flexible tube. The joint main body includes a step portion formed between the opening portion and the flow path portion and on which the end portion of the tube member inserted into the opening portion abuts. The tube member includes an annular recessed portion recessed from an outer peripheral surface of the tube member and formed on a flexible tube side with respect to an end surface on a joint main body side.

A method for producing the joint member according to a second example aspect of the present invention is a method for producing the joint member described above, and the method includes inserting the end portion of the tube member into the opening portion of the joint main body and causing the end portion of the tube member to abut on the step portion, and joining the joint main body and the end portion of the tube member by brazing.

A method for connecting a flexible tube to a joint member according to a third example aspect of the present invention, there is provided a method for connecting the flexible tube to the joint member described above, and the method includes inserting the tube member into a tube end of the flexible tube up to the annular recessed portion, and fixing the flexible tube from an outside in a radial direction with an annular clamp member at a position where the flexible tube and the tube member overlap.

Example Advantageous Effects of Invention

According to the above-described first to third example aspects, the range in which the brazing material protrudes from the joint portion is unlikely to vary.

EXAMPLE EMBODIMENT

A plurality of example embodiments of the present invention will be described below with reference to the drawings.

First Example Embodiment

Figure 1:
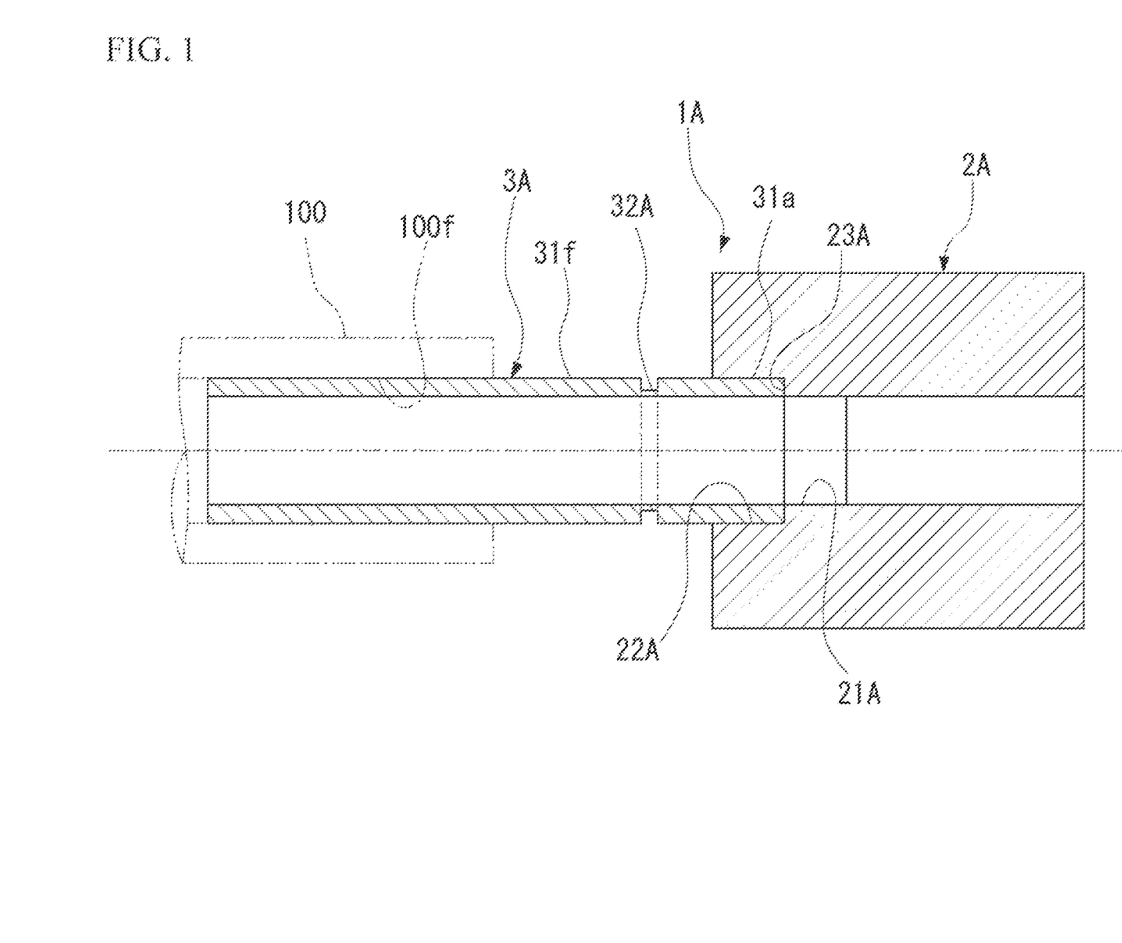
FIG. 1 is a diagram showing a minimum configuration of a joint member according to a first example embodiment of the present invention.

FIG. 1 is a diagram showing a minimum configuration of a joint member according to the present example embodiment.

As shown in this figure, a joint member 1A needs only to include at least a joint main body 2A and a tube member 3A. A flexible tube 100 is connected to the joint member 1A.

A flow path portion 21A is formed inside the joint main body 2A. The joint main body 2A is provided with an opening portion 22A having an inner diameter larger than that of the flow path portion 21A and communicating with the flow path portion 21A. An end portion 31a of the tube member 3A is inserted into the opening portion 22A. The joint main body 2A includes a step portion 23A. The step portion 23A is formed between the opening portion 22A and the flow path portion 21A. The end portion 31a of the tube member 3A inserted into the opening portion 22A abuts on the step portion 23A.

The end portion 31a of the tube member 3A is inserted into the opening portion 22A of the joint main body 2A. The tube member 3A is joined to the joint main body 2A by brazing. The tube member 3A is inserted into the flexible tube 100.

The tube member 3A includes an annular recessed portion 32A. The annular recessed portion 32A is recessed from an outer peripheral surface 31f of the tube member 3A. The annular recessed portion 32A is formed on the flexible tube 100 side with respect to the end portion 31a on the joint main body 2A side.

According to the present example embodiment, the annular recessed portion 32A is formed on the flexible tube 100 side with respect to the end portion 31a on the joint main body 2A side of the tube member 3A. As a result, when the opening portion 22A of the joint main body 2A and the end portion 31a of the tube member 3A are joined by brazing, the annular recessed portion 32A can prevent the brazing material from spreading toward the flexible tube 100 side along the outer peripheral surface 31f of the tube member 3A.

Thus, even when the brazing material protrudes from the joint portion between the joint main body 2A and the tube member 3A to the tube member 3A side, the range in which the brazing material protrudes from the joint portion is unlikely to vary.

When the variation in the range in which the brazing material protrudes can be suppressed, it is possible to prevent the smoothness of the outer peripheral surface 31f of the tube member 3A from being impaired at a portion to which the flexible tube 100 is connected in the tube member 3A.

Thus, it is possible to suppress the formation of a gap between the outer peripheral surface 31f of the tube member 3A connected to the flexible tube 100 and an inner peripheral surface 100f of the flexible tube 100.

Therefore, in the joint member 1A, when the joint main body 2A and the tube member 3A are joined by brazing, it is possible to prevent the brazing material from spreading along the outer peripheral surface 31f of the tube member 3A, and the fluid at a connection portion between the flexible tube 100 and the tube member 3A from leaking.

In addition, according to the present example embodiment, the end portion 31a of the tube member 3A is abutted on the step portion 23A of the joint main body 2A. As a result, the annular recessed portion 32A can be positioned with respect to the joint main body 2A in the tube axial direction.

Therefore, the annular recessed portion 32A can be secured at a fixed position on the tube member 3A side from the joint portion.

Therefore, the range in which the brazing material protrudes from the joint portion can be controlled, and thus it is possible to suppress the formation of the gap due to the brazing material between the outer peripheral surface 31f of the tube member 3A connected to the flexible tube 100 and the inner peripheral surface 100f of the flexible tube 100.

As a result, it is possible to suppress leakage of the fluid flowing through the flexible tube 100 from the connection portion between the outer peripheral surface 31f of the tube member 3A and the inner peripheral surface 100f of the flexible tube 100.

Second Example Embodiment

Figure 2:
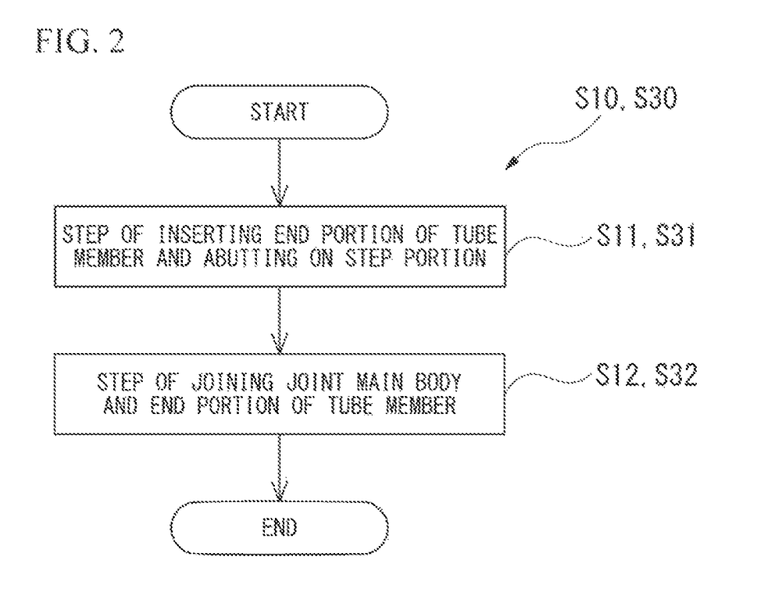
FIG. 2 is a diagram showing a minimum procedure of a method for producing a joint member according to a second example embodiment of the present invention.

FIG. 2 is a diagram showing a minimum procedure of a method for producing a joint member according to the present example embodiment.

As shown in this figure, a method S10 for producing the joint member needs only to include at least a step S11 of inserting the end portion of the tube member and abutting on the step portion, and a step S12 of joining the joint main body and the end portion of the tube member.

In the step S11 of inserting the end portion of the tube member and abutting on the step portion, the end portion 31a of the tube member 3A is inserted into the opening portion 22A of the joint main body 2A (refer to FIG. 1) shown in the first example embodiment, and the end portion 31a of the tube member 3A is abutted on the step portion 23A.

In the step S12 of joining the joint main body and the end portion of the tube member, the joint main body 2A and the end portion 31a of the tube member 3A are joined by brazing.

In such a method S10 for producing the joint member, the joint member 1A is used.

As a result, when the opening portion 22A of the joint main body 2A and the end portion 31a of the tube member 3A are joined by brazing, the annular recessed portion 32A can prevent the brazing material from spreading toward the flexible tube 100 side along the outer peripheral surface 31f of the tube member 3A.

Thus, even when the brazing material protrudes from the joint portion between the joint main body 2A and the tube member 3A to the tube member 3A side, the range in which the brazing material protrudes from the joint portion is unlikely to vary.

When the variation in the range in which the brazing material protrudes can be suppressed, it is possible to prevent the smoothness of the outer peripheral surface 31*f* of the tube member 3A from being impaired at a portion to which the flexible tube 100 is connected in the tube member 3A.

Thus, it is possible to suppress the formation of a gap between the outer peripheral surface 31*f* of the tube member 3A connected to the flexible tube 100 and the inner peripheral surface 100*f* of the flexible tube 100.

Therefore, in the present producing method, when the joint main body 2A and the tube member 3A are joined by brazing, it is possible to prevent the brazing material from spreading along the outer peripheral surface 31*f* of the tube member 3A, and the fluid at a connection portion between the flexible tube 100 and the tube member 3A from leaking.

Third Example Embodiment

Figure 3:
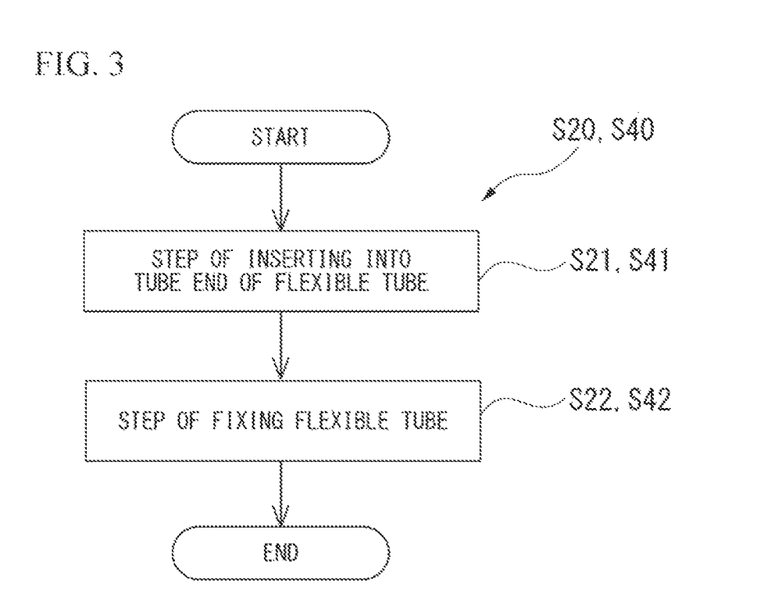
FIG. 3 is a diagram showing a minimum procedure of a method for connecting a flexible tube to a joint member according to a third example embodiment of the present invention.
Figure 4:
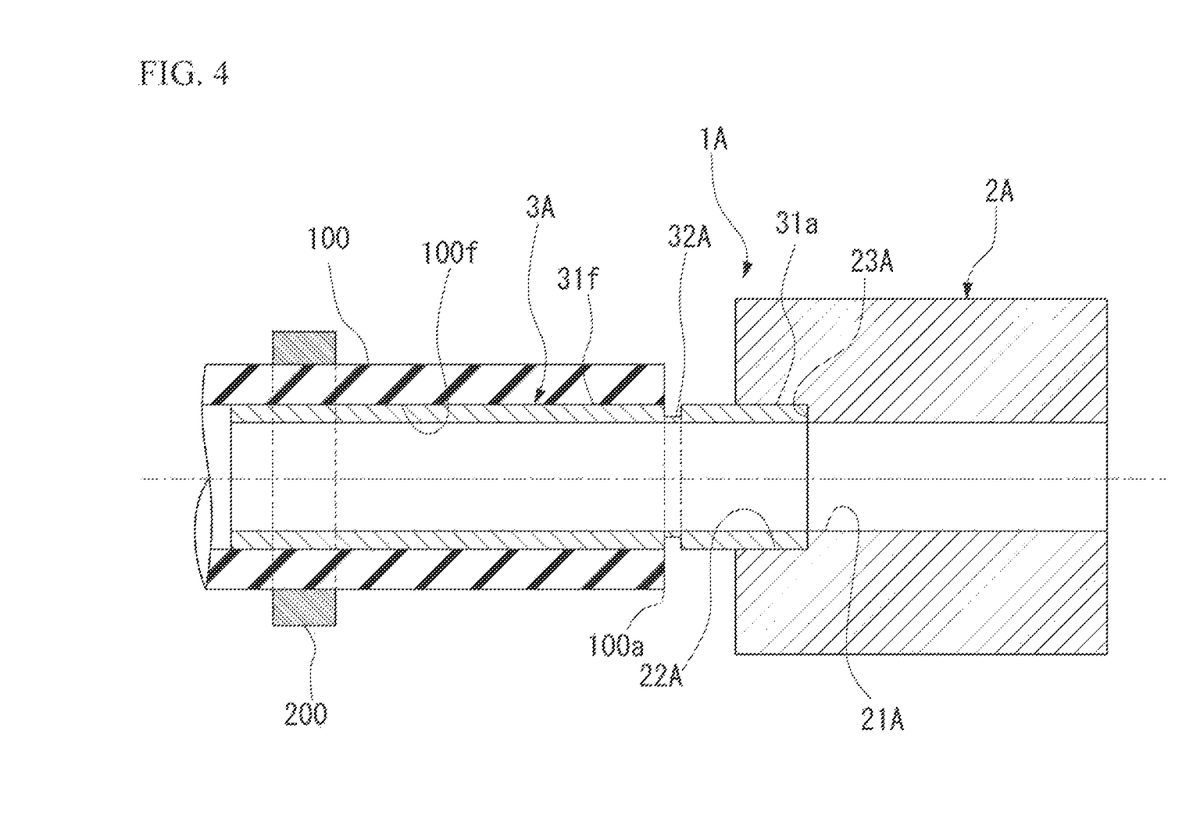
FIG. 4 is a cross-sectional view showing the joint member and the flexible tube connected by the method for connecting the flexible tube to the joint member according to the third example embodiment of the present invention.

FIG. 3 is a diagram showing a minimum procedure of a method for connecting a flexible tube to a joint member according to the present example embodiment. FIG. 4 is a cross-sectional view showing the joint member 1A and the flexible tube 100 connected by the method for connecting the flexible tube to the joint member according to the present example embodiment.

As shown in FIG. 3, a method S20 of connecting the flexible tube to the joint member needs only to include at least a step S21 of inserting into the tube end of the flexible tube and a step S22 of fixing the flexible tube.

As shown in FIG. 4, in the step S21 of inserting into the tube end of the flexible tube, the tube member 3A is inserted into a tube end 100*a* of the flexible tube 100 shown in the first example embodiment up to the recessed portion 32A.

In the step S22 of fixing the flexible tube, the flexible tube 100 is fixed from the outside in the radial direction by an annular clamp member 200 at a position where the flexible tube 100 and the tube member 3A overlap.

According to the present example embodiment, the joint member 1A is used.

As a result, when the opening portion 22A of the joint main body 2A and the end portion 31*a* of the tube member 3A are joined by brazing, the annular recessed portion 32A can prevent the brazing material from spreading toward the flexible tube 100 side along the outer peripheral surface 31*f* of the tube member 3A.

Thus, even when the brazing material protrudes from the joint portion between the joint main body 2A and the tube member 3A to the tube member 3A side, the range in which the brazing material protrudes from the joint portion is unlikely to vary.

When the variation in the range in which the brazing material protrudes can be suppressed, it is possible to prevent the smoothness of the outer peripheral surface 31*f* of the tube member 3A from being impaired at a portion to which the flexible tube 100 is connected in the tube member 3A.

Thus, it is possible to suppress the formation of a gap between the outer peripheral surface 31*f* of the tube member 3A connected to the flexible tube 100 and the inner peripheral surface 100*f* of the flexible tube 100.

Therefore, in the present connection method, when the joint main body 2A and the tube member 3A are joined by brazing, it is possible to prevent the brazing material from spreading along the outer peripheral surface 31*f* of the tube member 3A, and the fluid at a connection portion between the flexible tube 100 and the tube member 3A from leaking.

Fourth Example Embodiment (Joint Member)

Figure 5:
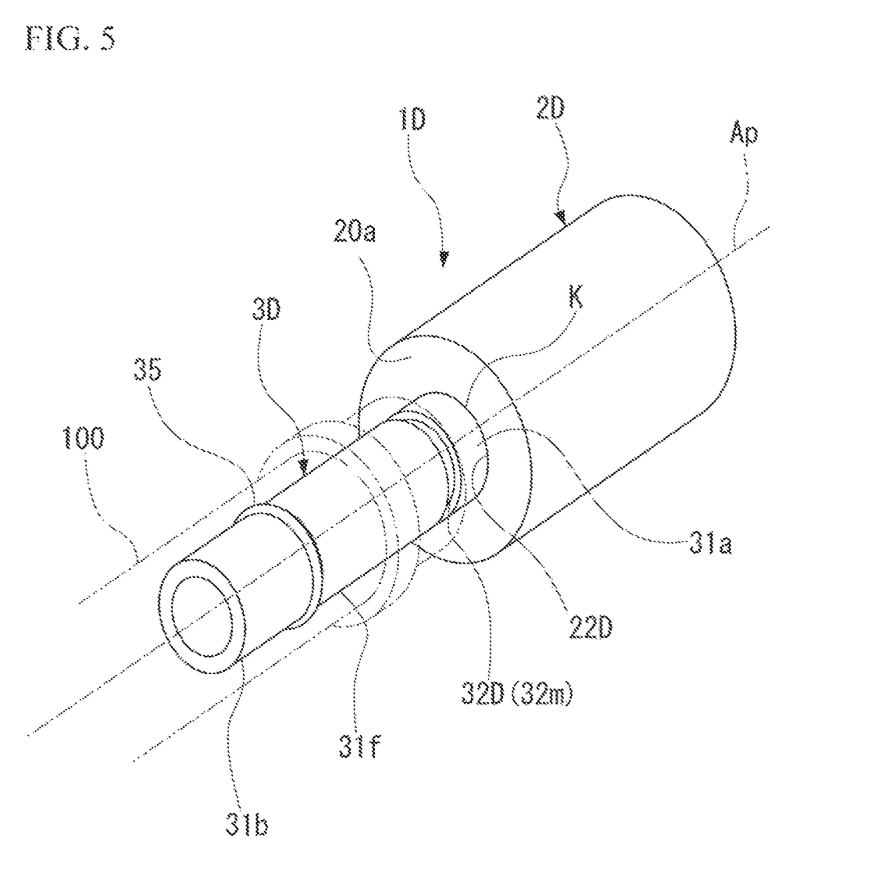
FIG. 5 is a perspective view showing a joint member according to a fourth example embodiment of the present invention.
Figure 6:
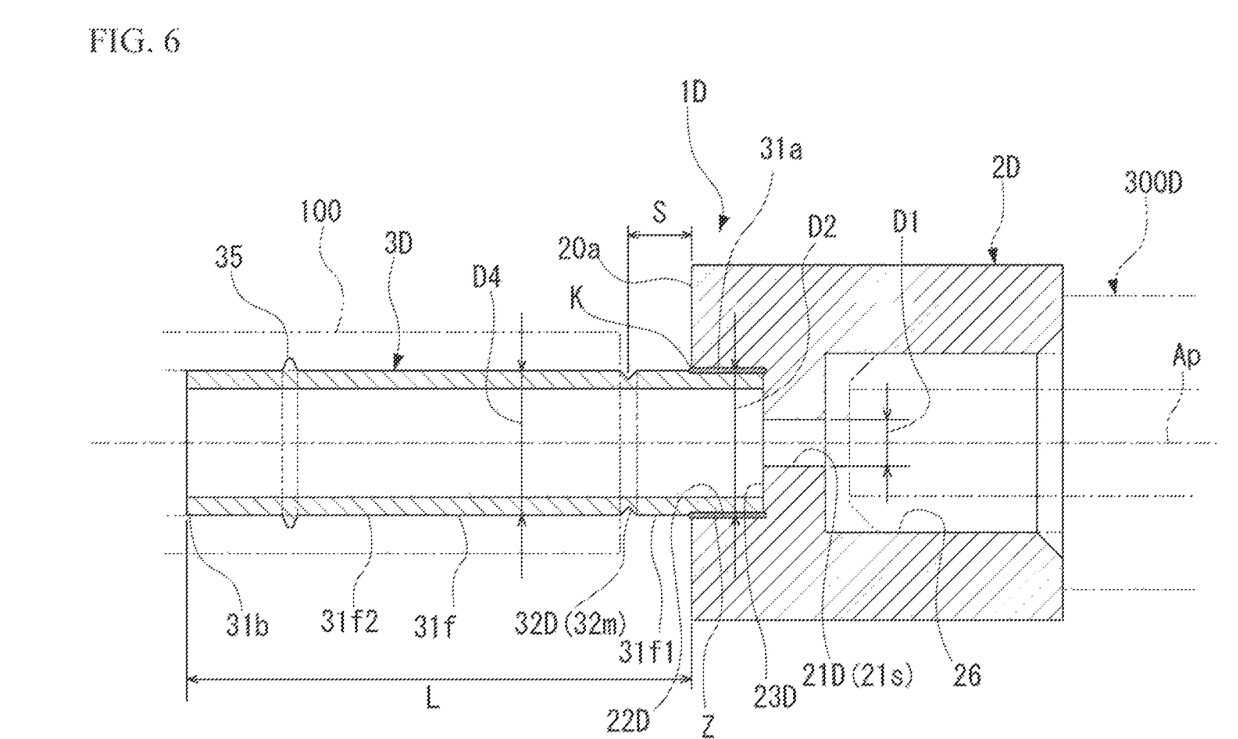
FIG. 6 is a cross-sectional view showing the joint member according to the fourth example embodiment of the present invention.

FIG. 5 is a perspective view showing a joint member according to the present example embodiment. FIG. 6 is a cross-sectional view showing the joint member according to the present example embodiment.

As shown in FIGS. 5 and 6, a joint member 1D of the present example embodiment is provided with a joint main body 2D and a tube member 3D. The flexible tube 100 is to be connected to the joint member 1D. A cooling medium (fluid) such as water supplied to a cooling member for cooling a heat-generating member such as a central processing unit (CPU), for example, in a computer apparatus such as a server or an electronic device is flowed in the joint member 1D.

(Joint Main Body)

The joint main body 2D is made of a metal material such as stainless steel. As shown in FIG. 6, the joint main body 2D includes a flow path portion 21D, an opening portion 22D, and a step portion 23D.

The flow path portion 21D extends inside the joint main body 2D along a tube axial direction Ap of the joint main body 2D.

The opening portion 22D is formed on one side (left side in FIG. 6) in the tube axial direction Ap with respect to the flow path portion 21D. The opening portion 22D communicates with the flow path portion 21D. The opening portion 22D is open to an end surface 20*a* on one side in the tube axial direction Ap in the joint main body 2D. The opening portion 22D has an inner diameter D2 larger than an inner diameter D1 of the flow path portion 21D.

A joint connecting portion 26 is formed on the other side (right side in FIG. 6) in the tube axial direction Ap with respect to the flow path portion 21D. The joint connecting portion 26 communicates with the flow path portion 21D. A mating side (male side) joint member 300D to be connected to the joint member 1D is to be inserted into the joint connecting portion 26. The joint member 1D and the mating side joint member 300D to be inserted into the joint connecting portion 26 of the joint member 1D are detachably connected to each other. The joint member 1D and the mating side joint member 300D engage with each other to maintain a connected state between both members.

Here, the structure in which the joint member 1D and the mating side joint member 300D are detachable and engaged with each other is not limited at all, and for example, a structure similar to that of a known one-touch joint can be adopted.

In addition, the joint main body 2D may not be a female side joint having the joint connecting portion 26 into which the mating side joint member 300D is to be inserted, but may be a male side joint having a projecting joint connecting portion to be inserted into the mating side joint member.

A throttle portion 21*s* is formed in the flow path portion 21D so as to be adjacent to the opening portion 22D on the other side in the tube axial direction Ap. The throttle portion 21*s* has an inner diameter D1 smaller than an inner diameter D4 of the flexible tube 100 to be connected to the opening portion 22D. The opening portion 22D communicates with the throttle portion 21*s* of the flow path portion 21D. It should be noted that in the present example embodiment, the throttle portion 21*s* is formed over the entire flow path portion 21D in the tube axial direction Ap. The throttle portion 21s may be formed over only part of the flow path portion 21D in the tube axial direction Ap.

The step portion 23D is formed between the opening portion 22D and the flow path portion 21D. The step portion 23D connects the inner peripheral surface of the opening portion 22D and the inner peripheral surface of the throttle portion 21s of the flow path portion 21D, and is orthogonal to the tube axial direction Ap.

(Tube Member)

The tube member 3D has a cylindrical shape extending in the tube axial direction Ap. The tube member 3D is made of a metal material such as stainless steel. The end portion 31a of the tube member 3D is inserted into the opening portion 22D of the joint main body 2D. The end portion 31a of the tube member 3D is inserted into the opening portion 22D until the end portion 31a abuts on the step portion 23D of the opening portion 22D. The tube member 3D inserted into the opening portion 22D projects from the end surface 20a of the joint main body 2D on the side separated in the tube axial direction Ap. The tube member 3D projects from the end surface 20a to a tip end portion 31b on the side separated in the tube axial direction Ap by a predetermined dimension L.

Figure 7:
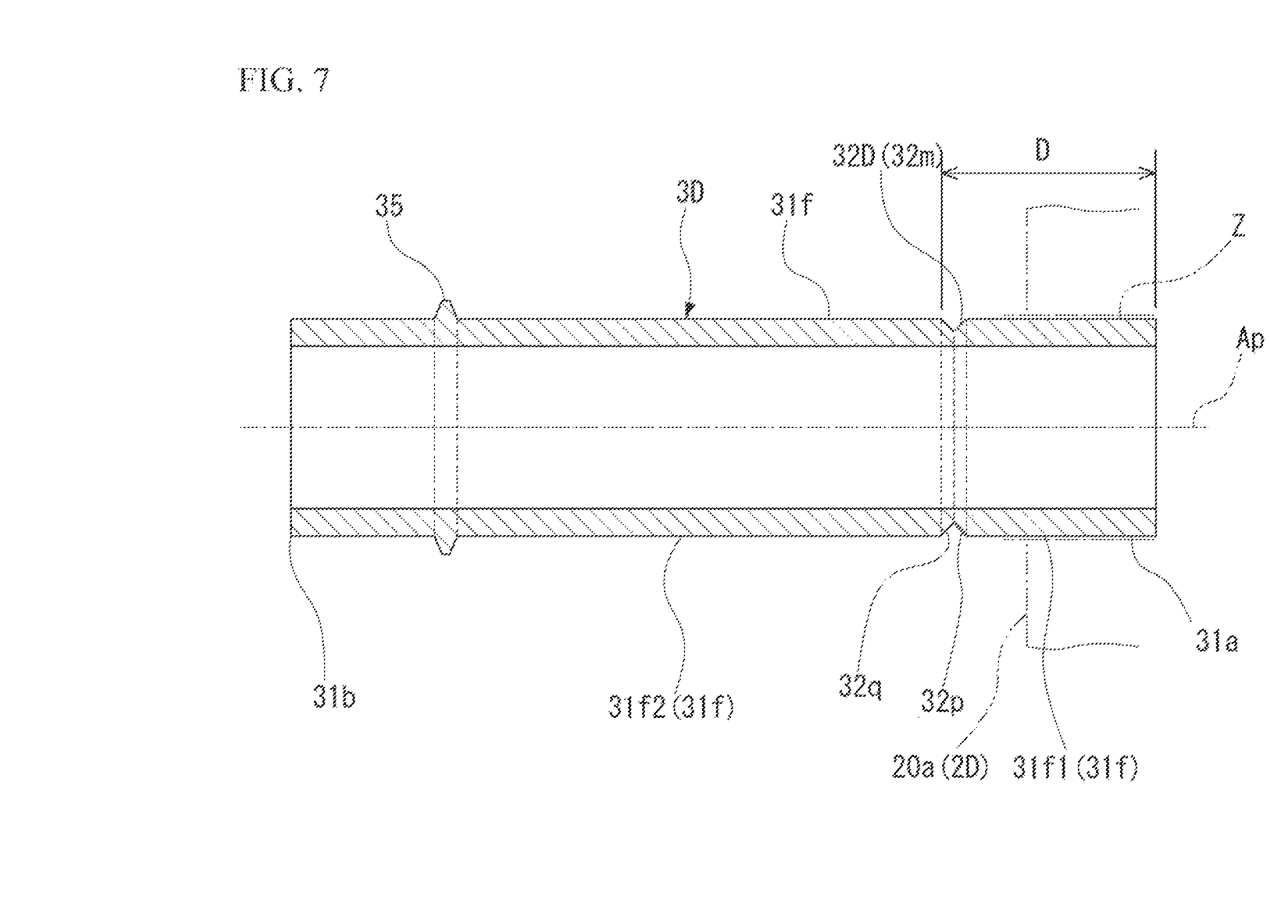
FIG. 7 is a cross-sectional view of a tube member constituting the joint member according to the fourth example embodiment of the present invention.

FIG. 7 is a cross-sectional view of a tube member constituting the joint member according to the present example embodiment.

As shown in FIGS. 6 and 7, the tube member 3D includes an annular recessed portion 32D. The annular recessed portion 32D is recessed from the outer peripheral surface 31f of the tube member 3D. The annular recessed portion 32D is a groove 32m continuous in the circumferential direction around the tube axial direction Ap.

The annular recessed portion 32D is formed on the tip end portion 31b side with respect to the end portion 31a on the joint main body 2D side in the tube axial direction Ap. The annular recessed portion 32D is formed at a position away from the end surface 20a of the joint main body 2D by a predetermined dimension S in the tube axial direction Ap.

As shown in FIG. 7, in the present example embodiment, the groove 32m has, for example, a V-shaped cross section, and includes a reduced diameter wall surface 32p and an enlarged diameter wall surface (wall portion) 32q on one side and the other side in the tube axial direction Ap, respectively. The reduced diameter wall surface 32p is formed continuously on the tip end portion 31b side in the tube axial direction Ap with respect to an outer peripheral surface 31f1 located on the end portion 31a side on the outer peripheral surface 31f of the tube member 3D. The reduced diameter wall surface 32p is formed so as to reduce the diameter inward in the radial direction from the outer peripheral surface 31f1. The enlarged diameter wall surface 32q is continuously formed on the tip end portion 31b side in the tube axial direction Ap with respect to the reduced diameter wall surface 32p. The enlarged diameter wall surface 32q is formed so as to expand the diameter outward in the radial direction from the inner periphery of the reduced diameter wall surface 32p. An outer peripheral surface 31f2 located on the tip end portion 31b side in the tube axial direction Ap with respect to the annular recessed portion 32D is continuously formed on the outer periphery of the enlarged diameter wall surface 32q.

Here, the dimension S in which the annular recessed portion 32D is separated from the end surface 20a of the joint main body 2D in the tube axial direction Ap is appropriately set in accordance with, for example, the material (quality of material) of the tube member 3D, the material of the brazing material Z, and the like. For example, when stainless steel is used as the material of the tube member 3D and nickel brazing is used as the brazing material Z, the dimension S is preferably formed in the range of 2 mm or more and 8 mm or less, and more preferably 2.5 mm or more and 6 mm or less.

A projection portion 35 projecting outward in the radial direction from the outer peripheral surface 31f2 of the tube member 3D is formed in the tube member 3D on the tip end portion 31b side with respect to the annular recessed portion 32D. The projection portion 35 is continuously formed over the entire circumference in the circumferential direction around the tube axial direction Ap.

The end portion 31a of the tube member 3D is joined to the joint main body 2D by brazing in a state of being inserted into the opening portion 22D of the joint member 1D. When brazing is performed along a boundary portion K between the opening portion 22D and the outer peripheral surface 31f1 of the tube member 3D on the end surface 20a of the joint main body 2D, the brazing material Z melted and liquefied enters a slight gap between the inner peripheral surface of the opening portion 22D and the outer peripheral surface of the tube member 3D due to the capillary phenomenon. The temperature of the brazing material Z entered is lowered and the brazing material Z is hardened, so that the end portion 31a of the tube member 3D and the joint main body 2D are joined by brazing. As such a brazing material Z, for example, nickel brazing, silver brazing, and the like are preferably used.

Here, the brazing material Z used for brazing the joint main body 2D and the tube member 3D may spread toward the tip end portion 31b side in the tube axial direction Ap along the outer peripheral surface 31f1 of the tube member 3D from the boundary portion K between the opening portion 22D and the outer peripheral surface 31f1 of the tube member 3D, due to the wettability. In this case, as shown in FIG. 7, the brazing material Z spreads within a range D from the end portion 31a of the tube member 3D on the joint main body 2D side to the enlarged diameter wall surface 32q on the side away from the joint main body 2D side in the annular recessed portion 32D. In other words, the brazing material Z does not spread beyond the enlarged diameter wall surface 32q of the annular recessed portion 32D to the outer peripheral surface 31f2 on the tip end portion 31b side with respect to the annular recessed portion 32D.

Figure 8:
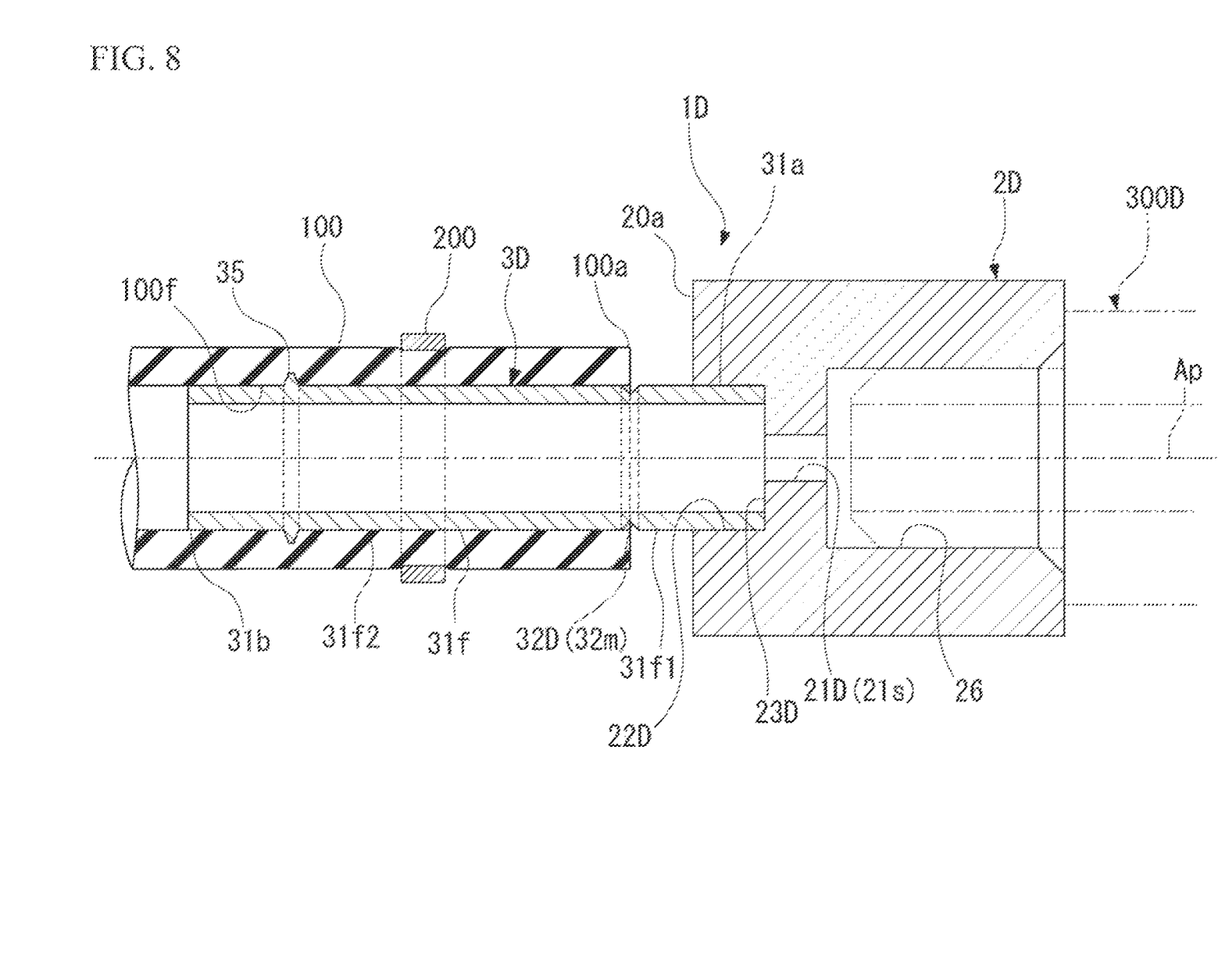
FIG. 8 is a cross-sectional view showing a state in which a flexible tube is connected to the joint member according to the fourth example embodiment of the present invention.

FIG. 8 is a cross-sectional view showing a state in which the flexible tube is connected to the joint member according to the present example embodiment.

As shown in this figure, the tube member 3D as described above is inserted into the flexible tube 100. The flexible tube 100 is made of, for example, a rubber-based material, a composite material containing a rubber-based material, or the like, and has flexibility. The flexible tube 100 may have, for example, a laminated structure in which a plurality of types of materials are laminated in the radial direction thereof. As such a flexible tube 100, for example, a flexible tube made of a material in which a synthetic rubber layer using epichlorohydrin rubber (ECO), a synthetic fiber braided layer using polyethylene terephthalate (PET) fiber, a synthetic rubber layer using ECO, and a synthetic rubber layer using fluorine-based rubber are sequentially laminated from the inside to the outside in the radial direction can be adopted.

In a state in which the tube member 3D is inserted into the flexible tube 100, the projection portion 35 bites into the inner peripheral surface 100f of the flexible tube 100. In addition, in a state in which the tube member 3D is inserted into the flexible tube 100, the flexible tube 100 and the tube member 3D are tightened and fixed from the outside in the radial direction by the annular clamp member 200. The clamp member 200 is disposed between the projection portion 35 and the annular recessed portion 32D in the tube axial direction Ap.

The tube end 100a of the flexible tube 100 is provided so as to be separated by a gap from the end surface 20a of the joint main body 2D of the joint member 1D along the tube axial direction Ap in a state in which the flexible tube is tightened and fixed by the clamp member 200.

When the flexible tube 100 with the tube member 3D inserted inside is tightened by the clamp member 200, the flexible tube 100 is elastically deformed so as to be crushed inward in the radial direction at the portion of the clamp member 200. As a result, the flexible tube 100 is elastically deformed so as to slightly extend in the tube axial direction Ap. When the tube end 100a abuts on the end surface 20a in a state in which the flexible tube is tightened and fixed by the clamp member 200, the extension of the flexible tube 100 in the tube axial direction Ap due to the tightening force of the clamp member 200 is restricted. As a result, elastic deformation such that the flexible tube 100 is crushed inward in the radial direction at the portion of the clamp member 200 is hindered. As a result, the flexible tube 100 may not be sufficiently tightened and fixed by the clamp member 200.

Therefore, in the present example embodiment, as described above, the tube end 100a and the end surface 20a of the joint main body 2D are separated from each other by the gap in a state in which the flexible tube 100 is tightened and fixed by the clamp member 200. Accordingly, elastic deformation such that the flexible tube 100 is crushed inward in the radial direction at the portion of the clamp member 200 is unlikely to be hindered. As a result, the flexible tube 100 is tightened and fixed by the clamp member 200.

(Method for Producing Joint Member)

Next, a method for producing the joint member in the present example embodiment will be described.

As shown in FIG. 2, a method S30 for producing the joint member is provided with a step S31 of inserting the end portion of the tube member and abutting on the step portion, and a step S32 of joining the joint main body and the end portion of the tube member.

In the step S31 of inserting the end portion of the tube member and abutting on the step portion, as shown in FIG. 6, the end portion 31a of the tube member 3D is inserted into the opening portion 22D of the joint main body 2D, and the end portion 31a of the tube member 3D is abutted on the step portion 23D.

In the step S32 of joining the joint main body and the end portion of the tube member, the joint main body 2D and the end portion 31a of the tube member 3D are joined by brazing. To this end, brazing is continuously performed in the circumferential direction along the boundary portion K between the opening portion 22D and the outer peripheral surface 31/1 of the tube member 3D in a state in which the end portion 31a of the tube member 3D is inserted into the opening portion 22D of the joint member 1D. As a result, the brazing material Z that is melted and liquefied enters a slight gap between the inner peripheral surface of the opening portion 22D and the outer peripheral surface of the tube member 3D due to the capillary phenomenon. The temperature of the brazing material Z entered is lowered and the brazing material Z is hardened, so that the end portion 31a of the tube member 3D and the joint main body 2D are joined by brazing.

(Method for Connecting Flexible Tube to Joint Member)

Next, a method for connecting the flexible tube to the joint member in the present example embodiment will be described.

As shown in FIG. 3, a method S40 for connecting the flexible tube to the joint member is provided with a step S41 of inserting into the tube end of the flexible tube and a step S42 of fixing the flexible tube.

Figure 9:
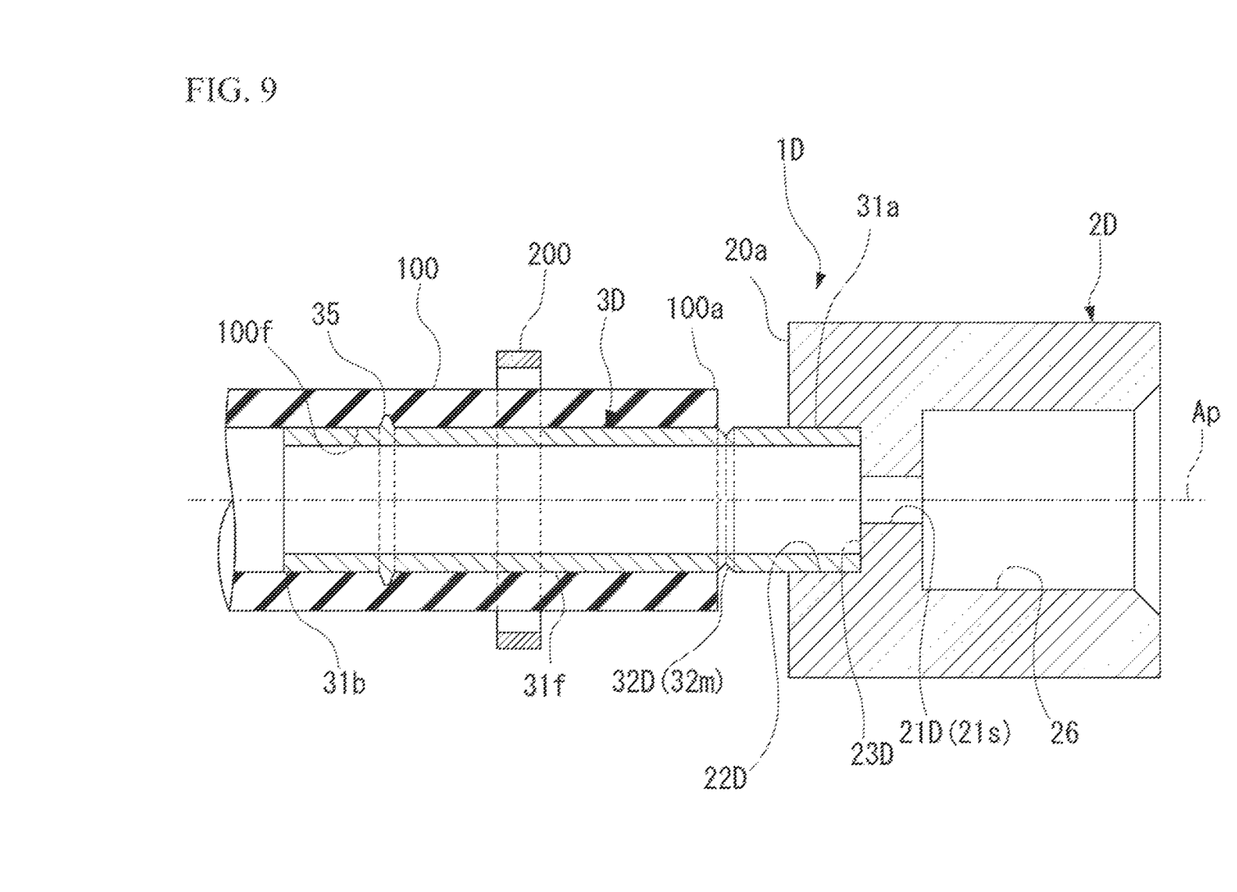
FIG. 9 is a cross-sectional view showing a state in which the tube member is inserted inside a tube end of the flexible tube by the method for connecting the flexible tube to the joint member according to the fourth example embodiment of the present invention.

FIG. 9 is a cross-sectional view showing a state in which the tube member is inserted inside the tube end of the flexible tube by the method for connecting the flexible tube to the joint member according to the present example embodiment.

As shown in this figure, in the step S41 of inserting into the tube end of the flexible tube, the tube member 3D is inserted inside the tube end 100a of the flexible tube 100. The tube member 3D is inserted into the flexible tube 100 to the same position as the annular recessed portion 32D in the tube axial direction Ap. At this time, the operator can easily align the tube end 100a of the flexible tube 100 while visually checking the annular recessed portion 32D. In this state, the tube end 100a of the flexible tube 100 is separated with a gap between the tube end 100a and the end surface 20a of the joint main body 2D.

In the step S42 of fixing the flexible tube 100, as shown in FIG. 8, the flexible tube 100 into which the tube member 3D is inserted is tightened and fixed from the outside in the radial direction by the annular clamp member 200. The clamp member 200 is disposed at a position where the flexible tube 100 and the tube member 3D overlap each other when viewed from the radial direction orthogonal to the tube axial direction Ap. At this time, when the flexible tube 100 is tightened by the clamp member 200, the flexible tube 100 is elastically deformed so as to be crushed inward in the radial direction at the portion of the clamp member 200. As a result, the flexible tube 100 is elastically deformed so as to slightly extend in the tube axial direction Ap. In the state before tightening, the tube end 100a of the flexible tube 100 is separated with a gap between the tube end 100a and the end surface 20a of the joint main body 2D. Therefore, even when the flexible tube 100 is extended by tightening the flexible tube 100 with the clamp member 200 and the tube end 100a moves in the tube axial direction Ap, the tube end 100a does not abut on the end surface 20a of the joint main body 2D. As a result, elastic deformation such that the flexible tube 100 is crushed inward in the radial direction at the portion of the clamp member 200 is unlikely to be hindered. As a result, the flexible tube 100 is tightened and fixed by the clamp member 200.

In such a joint member 1D, the joint main body 2D includes the step portion 23D on which the end portion 31a of the tube member 3D inserted into the opening portion 22D abuts. In addition, the tube member 3D includes the annular recessed portion 32D. In this configuration, the end portion 31a of the tube member 3D inserted into the opening portion 22D abuts on the step portion 23D, and thus the annular recessed portion 32D can be positioned with respect to the joint main body 2D in the tube axial direction Ap.

When the annular recessed portion 32D can be positioned, the annular recessed portion 32D can be secured at a fixed position on the tube member 3D side from the joint portion between the joint main body 2D and the tube member 3D.

When the annular recessed portion 32D can be secured, the range in which the brazing material protrudes from the joint portion can be controlled.

Thus, when the opening portion 22D of the joint main body 2D and the end portion 31a of the tube member 3D are joined by brazing, the annular recessed portion 32D can prevent the brazing material Z from spreading toward the flexible tube 100 side along the outer peripheral surface 31f of the tube member 3D.

Therefore, it is possible to prevent the smoothness of the outer peripheral surface 31f2 of the tube member 3D from being impaired by the brazing material Z that is wet and spread at the portion where the flexible tube 100 is to be connected in the tube member 3D.

Thus, it is possible to suppress the formation of a gap due to the brazing material between the outer peripheral surface 31f2 of the tube member 3D connected to the tube end 100a of the flexible tube 100 and the inner peripheral surface 100f of the flexible tube 100.

As a result, it is possible to prevent the fluid flowing through the flexible tube 100 from leaking from the connection portion between the outer peripheral surface 31f of the tube member 3D and the inner peripheral surface 100f of the flexible tube 100. In this manner, in the joint member 1D, when the joint main body 2D and the tube member 3D are joined by brazing, it is possible to prevent the brazing material Z from spreading along the outer peripheral surface 31f of the tube member 3D, and the fluid at a connection portion between the flexible tube 100 and the tube member 3D from leaking.

In such a joint member 1D, the annular recessed portion 32D is formed at a position away from the end portion 31a on the joint main body 2D side.

In this configuration, even when the brazing material Z spreads toward the flexible tube 100 side along the outer peripheral surface 31f1 of the tube member 3D, the brazing material Z enters the annular recessed portion 32D provided at a position away from the end portion 31a on the joint main body 2D side. As a result, it is possible to prevent the brazing material Z from further spreading toward the flexible tube 100 side.

In such a joint member 1D, the brazing material Z used for brazing the joint main body 2D and the tube member 3D spreads within the range D from the end portion 31a of the tube member 3D to the enlarged diameter wall surface 32q of the annular recessed portion 32D.

In this configuration, the brazing material Z is prevented from spreading to the tip end portion 31b side beyond the enlarged diameter wall surface 32q on the side away from the joint main body 2D side in the annular recessed portion 32D.

As a result, it is possible to prevent the smoothness of the outer peripheral surface 31f2 of the tube member 3D from being impaired at the portion where the flexible tube 100 is to be connected in the tube member 3D.

Therefore, it is possible to suppress the formation of a gap between the outer peripheral surface 31f2 of the tube member 3D connected to the tube end 100a of the flexible tube 100 and the inner peripheral surface 100f of the flexible tube 100.

As a result, it is possible to prevent the fluid flowing through the flexible tube 100 from leaking from the connection portion between the outer peripheral surface 31f of the tube member 3D and the inner peripheral surface 100f of the flexible tube 100.

In such a joint member 1D, the flow path portion 21D is provided with the throttle portion 21s.

In this configuration, by providing the throttle portion 21s in the flow path portion 21D, it is possible to form the step portion 23D on which the end portion 31a of the tube member 3D abuts, on the side where the tube member 3D is inserted with respect to the throttle portion 21s. In addition, by changing the inner diameter D1 of the throttle portion 21s, it is also possible to regulate the flow rate of the fluid flowing through the joint member 1D.

In such a method for producing the joint member 1D, even when the brazing material Z protrudes from the joint portion between the joint main body 2D and the tube member 3D to the tube member 3D side, the range in which the brazing material Z protrudes from the joint portion is unlikely to vary.

In such a method for connecting the flexible tube 100 to the joint member 1D, even when the brazing material Z protrudes from the joint portion between the joint main body 2D and the tube member 3D to the tube member 3D side, the range in which the brazing material Z protrudes from the joint portion is unlikely to vary.

EXAMPLES

Here, the range in which the brazing material Z is wet and spread when the tube member 3D and joint main body 2D of the joint member 1D are joined by brazing as described above was verified, and the results thereof are shown below.

Stainless steel was used as the material of the joint main body 2D of the joint member 1D. The inner diameter D2 of the opening portion 22D of the joint main body 2D was 6.0 mm (design tolerance: +0.03 mm, −0 mm), and the depth of the opening portion 22D in the tube axial direction Ap was 4.0 mm.

In addition, stainless steel was used as the material of the tube member 3D of the joint member 1D, and a tube member having an outer diameter of 6.0 mm (design tolerance: +0 mm, −0.05 mm) and a total length of 28.4 mm was used. One end portion 31a of the tube member 3D was inserted into the opening portion 22D by 4.0 mm so that the projection dimension (dimension L) of the tube member 3D from the end surface 20a to the tip end portion 31b of the joint main body 2D was 24.4 mm. In addition, in a state in which the tube member 3D was inserted into the opening portion 22D, the annular recessed portion 32D was separated from the end surface 20a by a dimension S of 3.0 mm in the tube axial direction Ap. The groove width of the annular recessed portion 32D was set to 0.5 mm, and the groove depth of the recessed portion 32D was set to 0.1 mm.

Nickel brazing was used as the brazing material Z, and the opening portion 22D of the joint main body 2D and the tube member 3D were brazed. In this manner, 50 joint members 1D were produced, and the dimension of the range in which the brazing material Z was wet and spread from the end surface 20a was measured for each of the produced joint members 1D.

Figure 10:
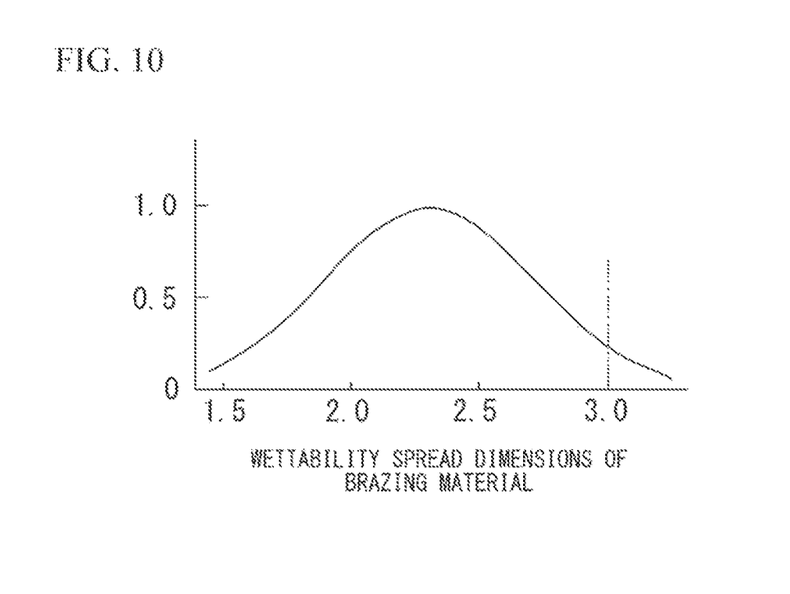
FIG. 10 is a diagram showing a normal distribution of measured values of wettability spread dimensions of a brazing material in an example of the present invention.

The results are shown in FIG. 10. FIG. 10 is a diagram showing a normal distribution of measured values of wettability spread dimensions of a brazing material.

As shown in FIG. 10, the average value Av of the normal distribution of the measured values of the wettability spread dimension from the end surface 20a of the brazing material Z was 2.36 mm, and the standard deviation σ was 0.40 mm. As a result, σ (=Av+σ) is 2.76 mm, 2σ (=Av+2σ) is 3.16 mm, and 3σ (=Av+3σ) is 3.56 mm. However, in reality, the brazing material Z wet and spread from the end surface 20a remains in the annular recessed portion 32D. As a result, the maximum value of the measured values of the wettability spread dimension from the end surface 20a of the brazing material Z was 3.00 mm.

Therefore, it was confirmed that the brazing material Z can be prevented from being wet and spreading beyond the annular recessed portion 32D by providing the annular recessed portion 32D at a position having the dimension S=3.00 mm from the end surface 20a.

In addition, when the tube member 3D of the joint member 1D was inserted into the flexible tube 100 and tightened and fixed by the clamp member 200, the amount of elongation of the flexible tube 100 in the tube axial direction Ap was verified, and the results thereof are shown below.

As the flexible tube 100, a flexible tube having an outer diameter of 11.3 mm and an inner diameter of 5.5 mm was used. As the flexible tube 100, a flexible tube made of a material in which a synthetic rubber layer using ECO, a synthetic fiber braided layer using PET fiber, a synthetic rubber layer using ECO, and a synthetic rubber layer using fluorine-based rubber are sequentially laminated from the inside to the outside in the radial direction was used. For the clamp member 200, for example, an ear clamp 167 produced by OETIKER (product name: model number 16700009 012. 3-706R, inner diameter 12.3 mm) was used.

The tube member 3D was inserted into the flexible tube 100 to a position where the tube end 100a visually overlapped with the annular recessed portion 32D. Thereafter, the clamp member 200 was tightened with a predetermined tightening force to fix the flexible tube 100.

Thereafter, the amount of elongation of the flexible tube 100 was measured before and after tightening.

Figure 11:
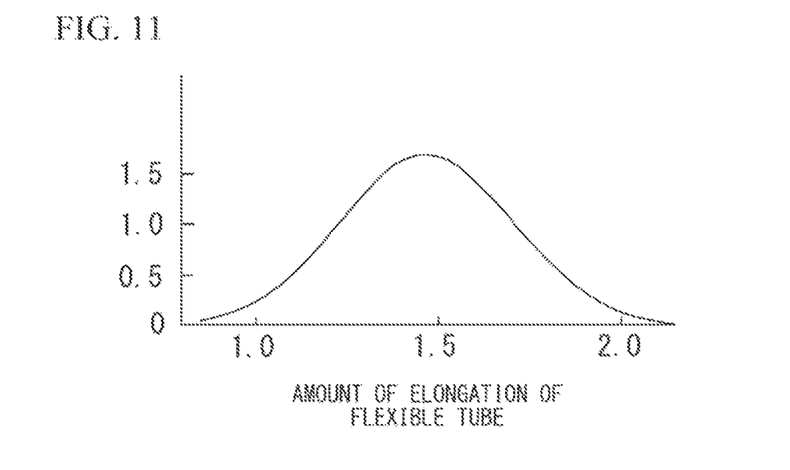
FIG. 11 is a diagram showing a normal distribution of measured values of the amount of elongation of the flexible tube when the flexible tube is tightened with a clamp member in the example of the present invention.

The results are shown in FIG. 11. FIG. 11 is a diagram showing a normal distribution of measured values of the amount of elongation of the flexible tube when the flexible tube was tightened with the clamp member.

As shown in FIG. 11, the minimum value of the measured values of the amount of elongation of the flexible tube 100 in the tube axial direction Ap was 1.23 mm, the maximum value was 2.12 mm, the average value Av was 1.52 mm, and the standard deviation σ was 0.23 mm. As a result, σ (=Av+σ) was 1.75 mm, 2σ (=Av+2σ) was 1.98 mm, and 3σ (=Av+3σ) was 2.21 mm. That is, the amount of elongation of the flexible tube 100 when the flexible tube was tightened and fixed by the clamp member 200 was within 3.00 mm. Therefore, it was confirmed that by providing the annular recessed portion 32D at a position 3.00 mm from the end surface 20a, the tube end 100a was prevented from abutting on the end surface 20a of the joint main body 2D when the flexible tube 100 was tightened by the clamp member 200.

It should be noted that in the above example embodiments, the annular recessed portion 32D is a groove 32m having a V-shaped cross section, but the cross-sectional shape of the recessed portion 32D is not limited thereto. For example, the annular recessed portion 32D may have another shape as appropriate, such as a U-shaped cross section. Furthermore, a plurality of annular recessed portions 32D may be formed at intervals in the tube axial direction Ap.

Figure 12:
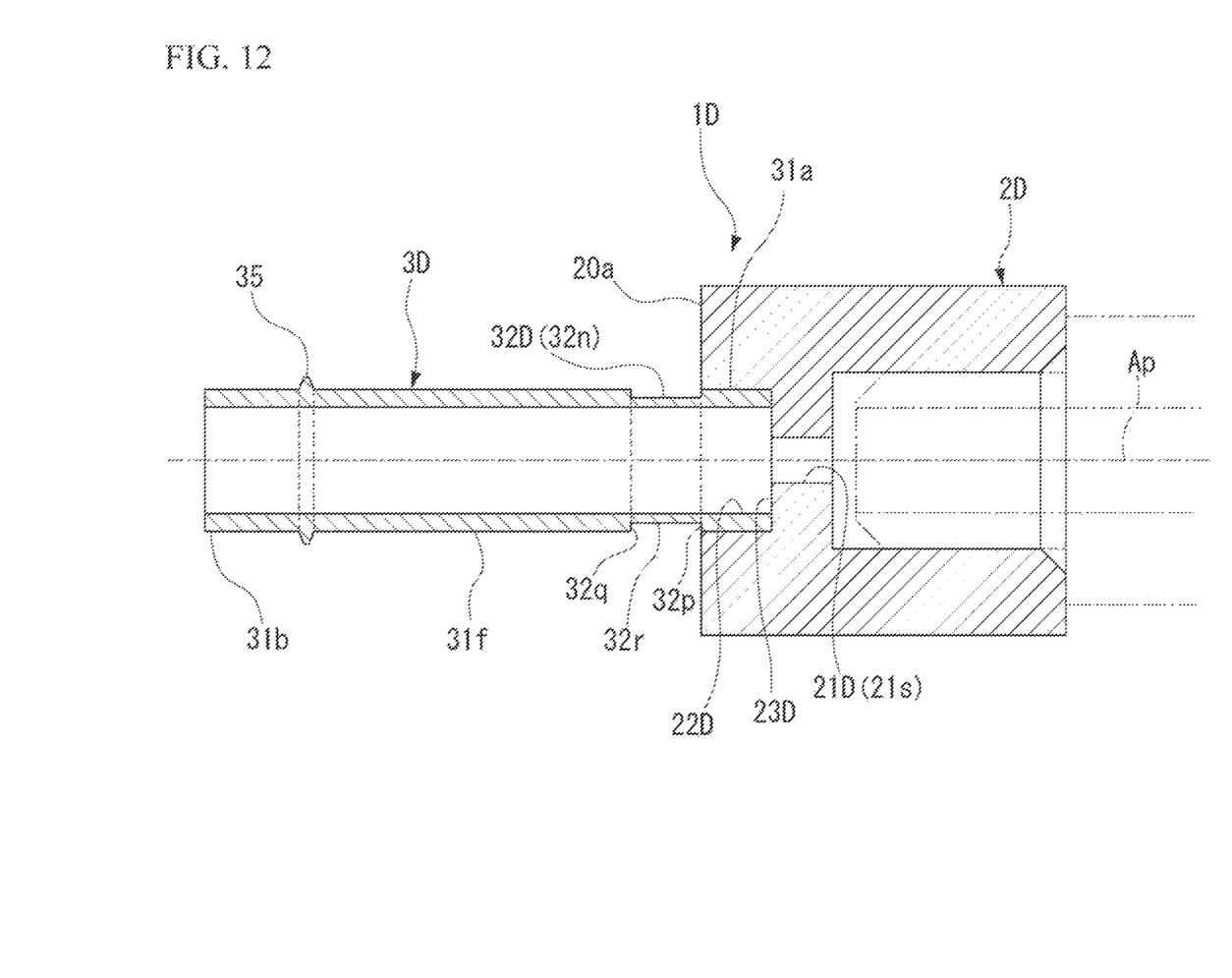
FIG. 12 is a cross-sectional view showing a modification example of the joint member according to an example embodiment of the present invention.

In addition, as shown in FIG. 12, the annular recessed portion 32D may be a groove 32n having a groove bottom surface 32r parallel to the tube axial direction Ap between the reduced diameter wall surface 32p and the enlarged diameter wall surface 32q. In this case, the position of the reduced diameter wall surface 32p may be the same as the end surface 20a of the joint main body 2D in the tube axial direction Ap, or may be a position different from the end surface 20a. The annular recessed portion 32D may not include a reduced diameter wall surface 32p, and the end portion 31a side thereof with respect to the enlarged diameter wall surface 32q may be formed with a constant outer diameter.

In addition, the application of the joint members 1A and 1D shown in the above example embodiments is not limited at all.

In addition to this, unless it deviates from the gist of the present invention, it is possible to select the configuration described in the above example embodiments and/or change it to another configuration as appropriate.

This application is based upon and claims the benefit of priority from Japanese Patent Application No. 2019-205339 filed on Nov. 13, 2019, the disclosure of which is incorporated herein in its entirety by reference.

INDUSTRIAL APPLICABILITY

The present invention can be applied to, for example, a joint member. According to the present invention, the range in which the brazing material protrudes from the joint portion between the joint main body and the tube member is unlikely to vary.

DESCRIPTION OF REFERENCE SIGNS 1A, 1D: Joint member
2A, 2D: Joint main body
3A, 3D: Tube member
20a: End surface
21A, 21D: Flow path portion
21s: Throttle portion
22A, 22D: Opening portion
23A, 23D: Step portion
31a: End portion
31f, 31f1, 31f2: Outer peripheral surface
32A, 32D: Annular recessed portion
32q: Enlarged diameter wall surface (wall portion)
100: Flexible tube
100a: Tube end
200: Clamp member
D1: Inner diameter of throttle portion
D4: Inner diameter of flexible tube
S10, S30: Method for producing joint member
S20, S40: Method for connecting flexible tube to joint member
S11, S12, S21, S22, S31, S32, S41, S42: Step
Z: Brazing material

What is claimed is:

1. A joint member to which a flexible tube is to be connected, the joint member comprising:
   a joint main body configured to include a flow path portion formed therein and an opening portion with an inner diameter larger than an inner diameter of the flow path portion and communicating with the flow path portion; and
   a tube member configured to include an end portion inserted into the opening portion of the joint main body and joined to the joint main body by brazing, and to be inserted into the flexible tube,
   wherein the flexible tube and the joint main body are connected to each other via the tube member and are otherwise separated from each other,
   wherein the joint main body comprises a step portion formed between the opening portion and the flow path portion and on which the end portion of the tube member inserted into the opening portion abuts, and
   the tube member comprises an annular recessed portion recessed from an outer peripheral surface of the tube member and formed on a flexible tube side with respect to an end surface on a joint main body side.

2. The joint member according to claim 1, wherein the annular recessed portion is formed on the outer peripheral surface of the tube member and is formed at a position away from the end surface on the joint main body side.

3. The joint member according to claim 1, wherein a brazing material used for brazing the joint main body and the tube member spreads within a range from the end surface of the tube member on the joint main body side to a wall portion in the annular recessed portion on a side away from the joint main body side.

4. The joint member according to claim 1, wherein the flow path portion comprises a throttle portion, and wherein the throttle portion has an inner diameter smaller than an inner diameter of the flexible tube.

5. A method for producing the joint member according to claim 1, the method comprising:
   inserting the end portion of the tube member into the opening portion of the joint main body and causing the end portion of the tube member to abut on the step portion; and
   joining the joint main body and the end portion of the tube member by brazing.

6. A method for connecting the flexible tube to a joint member to which a flexible tube is to be connected, the joint member including:
   a joint main body configured to include a flow path portion formed therein and an opening portion with an inner diameter larger than an inner diameter of the flow path portion and communicating with the flow path portion; and
   a tube member configured to include an end portion inserted into the opening portion of the joint main body and joined to the joint main body by brazing, and to be inserted into the flexible tube,
wherein the joint main body comprises a step portion formed between the opening portion and the flow path portion and on which the end portion of the tube member inserted into the opening portion abuts, and
the tube member comprises an annular recessed portion recessed from an outer peripheral surface of the tube member and formed on a flexible tube side with respect to an end surface on a joint main body side,
the method comprising:
inserting the tube member into a tube end of the flexible tube up to the annular recessed portion; and
fixing the flexible tube from an outside in a radial direction with an annular clamp member at a position where the flexible tube and the tube member overlap.

* * * * *